(12) United States Patent
Minamii (10) Patent No.: US 11,289,934 B2
(45) Date of Patent: Mar. 29, 2022

(54) CHARGER AND METHOD FOR CONTROLLING CHARGER

(71) Applicant: Toyota Jidosha Kabushiki Kaisha, Toyota (JP)

(72) Inventor: Toshihiko Minamii, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 16/800,381

(22) Filed: Feb. 25, 2020

(65) Prior Publication Data

US 2020/0287402 A1    Sep. 10, 2020

(30) Foreign Application Priority Data

Mar. 4, 2019   (JP) .............................. JP2019-038663

(51) Int. Cl.
*H02J 7/02* (2016.01)
*H02J 7/00* (2006.01)

(52) U.S. Cl.
CPC .............. *H02J 7/02* (2013.01); *H02J 7/0031* (2013.01); *H02J 7/00712* (2020.01)

(58) Field of Classification Search
CPC ...... H02J 7/35; H02J 2310/12; H02J 2310/16; H02J 3/14; H02J 1/102; H02J 1/106; H02J 1/14; H02J 13/00002; H02J 13/00006; H02J 2300/24; H02J 2300/26; H02J 2310/48; H02J 3/00; H02J 3/381; H02J 3/383; H02J 3/385; H02J 7/0031; H02J 9/06; H02J 9/062; H02J 9/068; H02J 7/0029; H02J 7/0047; H02J 7/00712; H02J 7/02; H02J 7/1423; H02J 7/24; H01H 2300/018; H01H 47/002; H01H 47/325; H01H 89/00
USPC .................................................. 320/106–115
See application file for complete search history.

(56) References Cited

U.S. PATENT DOCUMENTS

| | | | |
|---|---|---|---|
| 9,853,455 B1 * | 12/2017 | Casey | H02M 7/219 |
| 2007/0230224 A1 | 10/2007 | Yamada et al. | |
| 2014/0042983 A1 | 2/2014 | Yamaguchi et al. | |
| 2014/0091622 A1 * | 4/2014 | Lucas | H02J 3/383 307/19 |
| 2019/0052083 A1 * | 2/2019 | Lucas, Jr | H02J 3/18 |

FOREIGN PATENT DOCUMENTS

| JP | 2007-300781 A | 11/2007 |
|---|---|---|
| WO | 2012-144032 A1 | 10/2012 |

* cited by examiner

*Primary Examiner* — Binh C Tat
(74) *Attorney, Agent, or Firm* — Dinsmore & Shohl LLP (57) ABSTRACT

A charger includes: a relay provided between an input line and a conversion circuit; a voltage sensor that detects AC voltage input to the input line; and a controller that calculates effective value and frequency of the AC voltage based on a waveform of the AC voltage for a predetermined period. When the calculated effective value of the AC voltage is smaller than a voltage threshold during execution of external charging, the controller brings the relay into an open state. When the calculated effective value of the AC voltage is larger than the voltage threshold and the calculated frequency of the AC voltage is larger than a frequency threshold value after the external charging is halted, the controller brings the relay into a close state.

9 Claims, 6 Drawing Sheets

CHARGER AND METHOD FOR CONTROLLING CHARGER

CROSS REFERENCE TO RELATED APPLICATIONS

This nonprovisional application claims priority to Japanese Patent Application No. 2019-038663 filed on Mar. 4, 2019, with the Japan Patent Office, the entire contents of which are hereby incorporated by reference.

BACKGROUND

Field

The present disclosure relates to a charger and a method for controlling the charger.

Description of the Background Art

Conventionally, a vehicle has been known which includes a charger for performing external charging to charge an onboard power storage device using AC power supplied from an external power supply. Among such chargers mounted on vehicles, there is a charger that halts the external charging when an effective value of the AC voltage received from the external power supply during the external charging is decreased to be less than a voltage threshold (for example, WO 2012/144032).

SUMMARY

Generally, at the input side of the charger used for the external charging, a relay (precharging relay) is provided to prevent inrush current when starting the external charging. This relay is controlled to be in a close state during the external charging. During halting of the external charging, the relay is in the open state in preparation for subsequent resumption of charging.

Even when the frequency of the AC voltage is decreased during the external charging, the external charging can be performed as long as the effective value of the AC voltage is a normal value or a value close thereto. Hence, there is a need to continue the external charging.

However, when the frequency of the AC voltage has a very low value (very low frequency), for example, even if the actual effective value of the AC voltage is a normal value, the effective value of the AC voltage calculated by the charger may not become a normal value depending on a method for calculating the effective value of the AC voltage by the charger, with the result that the effective value of the AC voltage may periodically become larger or smaller than the voltage threshold in accordance with a fluctuation in instantaneous value of the AC voltage. Therefore, when the external charging is simply halted and resumed in accordance with a result of comparison between the voltage threshold and the effective value of the AC voltage calculated by the charger, relay hunting occurs in a state of very low frequency. In the relay hunting, the halting and resumption of the external charging (i.e., opening and closing of the relay) is periodically repeated in accordance with a fluctuation in instantaneous value of the AC voltage. This can be a factor of deterioration of the relay.

The present disclosure has been made to solve the above-described problem, and has an object to continue external charging even when a frequency of AC voltage is low while preventing hunting of a relay in a charger for performing the external charging to charge an onboard power storage device using AC power supplied from an external power supply.

(1) A charger according to the present disclosure is a charger for performing external charging to charge a power storage device using AC power supplied from an external power supply. The charger includes: an input line connectable to the external power supply; a conversion circuit that performs power conversion between the input line and the power storage device; a relay provided between the input line and the conversion circuit; a voltage sensor that detects AC voltage input to the input line; and a controller that periodically performs a process for calculating effective value and frequency of the AC voltage based on a waveform of the AC voltage for a predetermined period. When a charging halting condition is satisfied during execution of the external charging, the controller brings the relay into an open state. When a charging resumption condition is satisfied after the external charging is halted, the controller brings the relay into a close state. The charging halting condition is set to a condition that the calculated effective value of the AC voltage is smaller than a voltage threshold. The charging resumption condition is set to a condition that the calculated effective value of the AC voltage is larger than the voltage threshold and the calculated frequency of the AC voltage is larger than a frequency threshold value.

In the above-described charger, the relay is provided between the input line and the conversion circuit. The "charging halting condition" for bringing the relay into the open state during the execution of the external charging is set to the condition that the calculated effective value of the AC voltage is smaller than the voltage threshold. Accordingly, even when the frequency of the AC voltage is decreased to be less than the frequency threshold value, the relay is maintained in the open state until the calculated effective value of the AC voltage becomes less than the voltage threshold. Hence, the external charging can be continued even when the frequency of the AC voltage has a low value of less than the frequency threshold value.

Thereafter, when the calculated effective value of the AC voltage becomes smaller than the voltage threshold due to decrease of the frequency of the AC voltage to a very low frequency, the charging halting condition is satisfied. Hence, the relay is brought into the open state in preparation for subsequent resumption of charging.

The "charging resumption condition" for bringing the relay into the close state again after the halting of the external charging is set to the condition that the calculated effective value of the AC voltage is larger than the voltage threshold and the calculated frequency of the AC voltage is larger than the frequency threshold value. Accordingly, for example, when the frequency of the AC voltage is maintained at the very low frequency during halting of charging, even if the calculated effective value of the AC voltage periodically becomes larger or smaller than the voltage threshold in accordance with a fluctuation in instantaneous value of the AC voltage, the relay is maintained in the open state unless it is determined that the frequency of the AC voltage is larger than the frequency threshold value. Accordingly, the state of the relay is prevented from hunting between the close state and the open state in accordance with a fluctuation in instantaneous value of the AC voltage in the state of very low frequency.

As a result, even when the frequency of the AC voltage is low, the external charging can be continued while preventing hunting of the relay in the charger for performing the external charging to charge the onboard power storage device using AC power supplied from an external power supply.

(2) In a certain embodiment, when the waveform of the AC voltage for the predetermined period includes a waveform of the AC voltage for one period, the controller calculates effective value and frequency of the AC voltage for the one period. When the waveform of the AC voltage for the predetermined period does not include the waveform of the AC voltage for the one period, the controller calculates an effective value of the AC voltage for the predetermined period. The frequency threshold value is set to a value obtained by converting the predetermined period into a frequency.

In the above-described embodiment, when the actual frequency of the AC voltage is decreased to be less than the frequency threshold value, the waveform of the AC voltage for the one period is not included in the predetermined period, with the result that the calculated effective value of the AC voltage is an effective value for a period shorter than the one period, rather than the effective value for the one period. Thus, the calculated effective value of the AC voltage is changed in accordance with a fluctuation in instantaneous value of the AC voltage. Even in such a situation, in the above-described embodiment, the relay is maintained in the close state until the calculated effective value of the AC voltage becomes less than the voltage threshold (i.e., until the actual frequency of the AC voltage is further decreased to be less than the very low frequency) instead of halting the charging immediately and opening the relay, whereby the external charging can be continued.

(3) In a certain embodiment, the charger further includes a resistor provided between the input line and the conversion circuit. The relay is connected to the resistor in parallel.

In the above-described embodiment, the relay is brought into the open state when starting the external charging, whereby current sent from the external power supply to the charger is restricted by the resistor. Accordingly, rush current can be prevented. Moreover, after preventing the rush current, the relay is brought into the close state, whereby the external charging can be performed without the restriction by the resistor.

(4) A method for controlling a charger according to the present disclosure is a method for controlling a charger for performing external charging to charge a power storage device using AC power supplied from an external power supply. The charger includes: an input line connectable to the external power supply; a conversion circuit that performs power conversion between the input line and the power storage device; a relay provided between the input line and the conversion circuit; and a voltage sensor that detects AC voltage input to the input line. The method includes: periodically performing a process for calculating effective value and frequency of the AC voltage based on a waveform of the AC voltage for a predetermined period; bringing the relay into an open state when a charging halting condition is satisfied during execution of the external charging; and bringing the relay into a close state when a charging resumption condition is satisfied after the external charging is halted. The charging halting condition is set to a condition that the calculated effective value of the AC voltage is smaller than a voltage threshold. The charging resumption condition is set to a condition that the calculated effective value of the AC voltage is larger than the voltage threshold and the calculated frequency of the AC voltage is larger than a frequency threshold value.

Also in the above-described control method, the same function and effect as those in (1) above can be exhibited.

The foregoing and other objects, features, aspects and advantages of the present disclosure will become more apparent from the following detailed description of the present disclosure when taken in conjunction with the accompanying drawings.

DETAILED DESCRIPTION

The following describes embodiments of the present disclosure with reference to figures in detail. It should be noted that the same or corresponding portions in the figures are given the same reference characters and are not described repeatedly.

Figure 1:
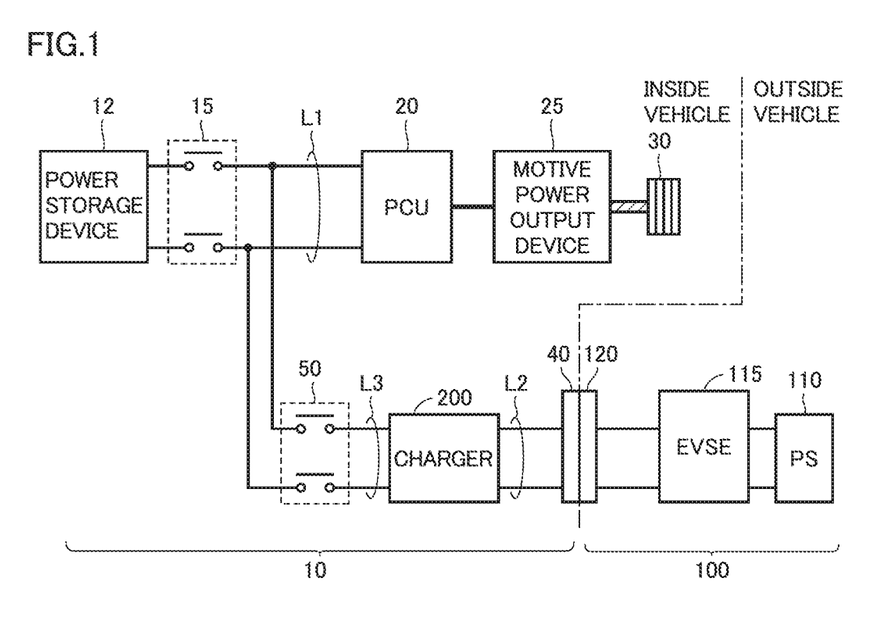
FIG. 1 shows an exemplary entire configuration of a charging system including a charger.

FIG. 1 shows an exemplary entire configuration of a charging system including a charger 200 according to the present embodiment. The charging system includes a vehicle 10 and a power supply facility 100.

Power supply facility 100 includes: an AC power supply 110 external to the vehicle; EVSE (Electric Vehicle Supply Equipment) 115; and a connector 120. AC power supply 110 is constituted of, for example, a commercial system power supply, but is not limited to this. Various power supplies are applicable thereto. EVSE 115 includes a charging cable for supplying power from AC power supply 110 to vehicle 10, and supplies AC power from AC power supply 110 to vehicle 10 via the charging cable.

Vehicle 10 includes a power storage device 12, a system main relay (hereinafter, also referred to as "SMR") 15, a power control unit (hereinafter, also referred to as "PCU") 20, a motive power output device 25, and driving wheels 30.

Power storage device 12 is a rechargeable DC power supply, and is constituted of a secondary battery such as a nickel-metal hydride battery or a lithium ion battery, for example. Power storage device 12 stores: power supplied from AC power supply 110 of power supply facility 100; and power generated in motive power output device 25. It should be noted that a large-capacity capacitor can be also employed as power storage device 12. SMR 15 is provided between power storage device 12 and a power line L1 connected to PCU 20. SMR 15 is a relay that electrically connects/separates power storage device 12 to/from power line L1.

PCU 20 generally represents a power conversion device that receives power from power storage device 12 and that drives motive power output device 25. For example, PCU 20 includes: an inverter that drives a motor included in motive power output device 25; a converter that boosts power output from power storage device 12; and the like. Motive power output device 25 generally represents a device that drives driving wheels 30. For example, motive power output device 25 includes a motor that drives driving wheels 30, and the like. Moreover, motive power output device 25 generates power during braking of the vehicle or the like by the motor that drives driving wheels 30, and outputs the generated power to PCU 20.

Vehicle 10 further includes an inlet 40, a charging relay 50, and a charger 200.

Inlet 40 is connected to an input line L2 of charger 200. Inlet 40 is connectable to connector 120 of power supply facility 100. Charging relay 50 is a relay that electrically connects/separates power line L1 to/from output line L3 of charger 200.

In a state (hereinafter, also referred to as "plug-in state") in which connector 120 of power supply facility 100 is connected to inlet 40 of vehicle 10, AC power (hereinafter, also referred to as "system power") from power supply facility 100 is input to input line L2 of charger 200. During execution of charging (hereinafter, also referred to as "external charging") of power storage device 12 using the system power supplied from power supply facility 100, charger 200 converts the system power received from input line L2 into DC power, and outputs the DC power to an output line L3. The DC power output to output line L3 is supplied to power storage device 12 via charging relay 50 and SMR 15. Accordingly, power storage device 12 is externally charged.

Figure 2:
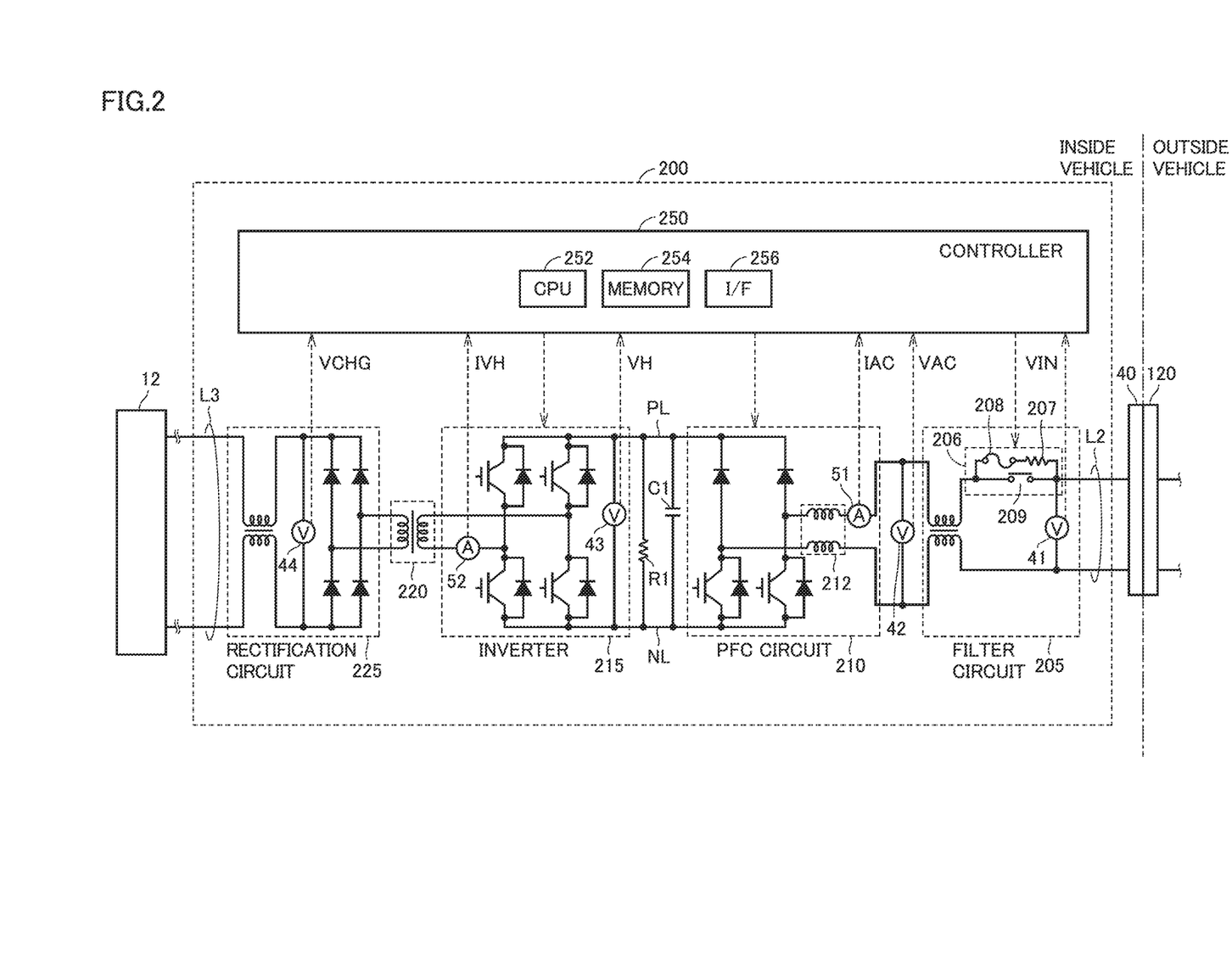
FIG. 2 shows a circuit configuration of the charger.

FIG. 2 shows a circuit configuration of charger 200. It should be noted that the circuit configuration shown in FIG. 2 is just exemplary, and the circuit configuration of charger 200 is not limited to the configuration shown in FIG. 2.

Charger 200 includes a filter circuit 205, a PFC circuit 210, an inverter 215, an isolation transformer 220, a rectification circuit 225, a controller 250, a capacitor C1, and a discharging resistor R1. Filter circuit 205, PFC circuit 210, inverter 215, isolation transformer 220, and rectification circuit 225 are connected to an electric path from input line L2 to output line L3 in series in this order.

Filter circuit 205 removes noise included in the system power sent from AC power supply 110 to input line L2, and outputs to PFC circuit 210 the system power from which the noise has been removed.

Filter circuit 205 includes a precharging circuit 206 provided in an electric path between input line L2 and PFC circuit 210. Precharging circuit 206 includes a precharging resistor 207, a fuse 208, and a precharging relay 209. Precharging resistor 207 and fuse 208 are connected to each other in series. Precharging relay 209 is connected to precharging resistor 207 and fuse 208 in parallel.

Precharging relay 209 is opened or closed based on a control signal from controller 250. When precharging relay 209 is in the open state, current from input line L2 toward PFC circuit 210 and inverter 215 through filter circuit 205 is restricted by precharging resistor 207. Therefore, with precharging relay 209 being in the open state, precharging can be performed to charge capacitor C1 while preventing rush current to PFC circuit 210. Moreover, by bringing precharging relay 209 into the close state after completion of the precharging of capacitor C1, the external charging can be performed without the restriction by precharging resistor 207.

Based on a control signal from controller 250, PFC circuit 210 converts AC power supplied from filter circuit 205 into DC power, and outputs the DC power to inverter 215. PFC circuit 210 includes: a switching circuit that converts AC power into DC power; and a reactor 212 provided at the input side of the switching circuit. The switching circuit of PFC circuit 210 forms a boosting chopper circuit together with reactor 212, and can boost power received from inlet 40.

Inverter 215 is connected to PFC circuit 210 by a positive electrode line PL and a negative electrode line NL (DC power line pair). Based on a control signal from controller 250, inverter 215 converts DC power received from PFC circuit 210 into AC power, and outputs the AC power to isolation transformer 220. Inverter 215 is constituted of a single-phase bridge circuit, for example.

Capacitor C1 is connected between positive electrode line PL and negative electrode line NL. Capacitor C1 smooths voltage fluctuation between positive electrode line PL and negative electrode line NL.

Discharging resistor R1 is connected between positive electrode line PL and negative electrode line NL in parallel with capacitor C1. Discharging resistor R1 discharges power stored in capacitor C1 when the external charging is halted, for example.

Isolation transformer 220 includes a core made of a magnetic material, and a primary coil and a secondary coil wound around the core. The primary coil and the secondary coil are electrically isolated from each other and connected to inverter 215 and rectifier circuit 225, respectively. Isolation transformer 220 converts the AC power from inverter 215 into voltage corresponding to a ratio of the number of windings of the primary coil and the number of windings of the secondary coil, and outputs it to rectification circuit 225.

Rectification circuit 225 converts the AC power received from isolation transformer 220 into DC power, and outputs the converted DC power to output line L3. The DC power output from rectification circuit 225 to output line L3 is supplied to power storage device 12.

Charger 200 further includes voltage sensors 41, 42, 43, 44 and current sensors 51, 52. Voltage sensor 41 detects voltage (hereinafter, also referred to as "system voltage VIN") of the system power input to filter circuit 205. Voltage sensor 42 detects voltage VAC at the input side of PFC circuit 210. Voltage sensor 43 detects voltage VH at the input side of inverter 215. Voltage sensor 44 detects voltage VCHG at the output side of rectification circuit 225. Current sensor 51 detects current IAC flowing through reactor 212 in PFC circuit 210. Current sensor 52 detects current IVH at the output side of inverter 215. Each sensor outputs a signal indicating a detection result to controller 250.

Controller 250 includes a CPU (Central Processing Unit; processing device) 252, a memory 254, and an I/F device 256 that receives and sends various signals. Based on various signals received from I/F device 256 and information stored in memory 254, controller 250 performs a predetermined calculation process using CPU 252, and controls precharging relay 209, PFC circuit 210, and inverter 215 based on the calculation result, thereby performing the external charging.

<Continuation, Halting and Resumption of External Charging Based on System Voltage VIN>

Controller 250 calculates the effective value and frequency of system voltage VIN based on system voltage VIN detected by voltage sensor 41. It should be noted that an effective value of a signal is defined as a square root of a mean of squares of values of the signal, and is referred to as "RMS" (Root Mean Square). In the description below, the effective value of system voltage VIN calculated by controller 250 is also referred to as "system voltage effective value VINrms", and the frequency of system voltage VIN calculated by controller 250 is also referred to as "system frequency F".

Moreover, in the description below, a peak value of system voltage VIN in the normal state is also referred to as "normal peak value V1", the effective value of system voltage VIN in the normal state is also referred to as "normal effective value V1rms", and the frequency of system voltage VIN in the normal state is also referred to as "normal frequency". Normal effective value V1rms is a value obtained by dividing normal peak value V1 by the square root of 2. For example, when normal peak value V1 is about 141 V, normal effective value V1 rms is about 100 V. Moreover, the normal frequency can be about 50 Hz, for example.

Controller 250 periodically repeats the following process: a waveform of system voltage VIN detected by voltage sensor 41 is sampled for a predetermined period T (for example, 40 msec); and system voltage effective value VINrms and system frequency F are calculated from the sampled voltage waveform for predetermined period T.

When the voltage waveform for predetermined period T includes an AC voltage waveform for at least one period, controller 250 calculates, as "system voltage effective value VINrms", the effective value (root mean square) of the AC voltage waveform for the one period. Specifically, controller 250 integrates a value of the square of an instantaneous value of system voltage VIN for the one period, and calculates, as "system voltage effective value VINrms", a value of the square root of a value obtained by dividing the integrated value by the one period of the AC voltage. Further, controller 250 calculates, as "system frequency F", a reciprocal of the one period of the AC voltage (period of time from a zero cross point at which system voltage VIN is changed in sign from a negative sign to a positive sign to a zero cross point at which system voltage VIN is changed next in sign from a negative sign to a positive sign).

On the other hand, when the voltage waveform for predetermined period T does not include the AC voltage waveform for the at least one period, controller 250 calculates, as "system voltage effective value VINrms", the effective value (root mean square) of the voltage waveform for predetermined period T. Specifically, controller 250 integrates a value of the square of an instantaneous value of system voltage VIN for predetermined period T, and calculates, as "system voltage effective value VINrms", a value of the square root of a value obtained by dividing the integrated value by predetermined period T. It should be noted that when the voltage waveform for predetermined period T does not include the AC voltage waveform for the at least one period, controller 250 cannot calculate system frequency F because the period of the AC voltage is unknown. Hence, controller 250 only determines that system frequency F is less than frequency threshold value Fth, and does not calculate a detailed value of system frequency F. It should be noted that frequency threshold value Fth is set to a value obtained by converting predetermined period T into a frequency, i.e., a reciprocal (=1/T) of predetermined period T. Therefore, frequency threshold value Fth is the minimum value of system frequency F that can be calculated by controller 250. For example, when predetermined period T is 40 msec, frequency threshold value Fth is 25 Hz (=1/40 msec) and controller 250 cannot calculate system frequency F of less than 25 Hz. In the description below, the frequency that is less than frequency threshold value Fth is also referred to as "low frequency".

During the external charging, by comparing calculated system voltage effective value VINrms with predetermined voltage threshold Vth, controller 250 determines whether or not system voltage VIN is decreased due to halting of supply of power or the like. Voltage threshold Vth is set to a value lower than normal effective value V1rms. For example, when normal effective value V1rms is about 100 V, voltage threshold Vth can be set to about 50 V.

When calculated system voltage effective value VINrms is larger than voltage threshold Vth, controller 250 determines that system voltage VIN is not decreased, and continues the external charging. Specifically, controller 250 continues the operations of PFC circuit 210 and inverter 215, and maintains precharging relay 209 in the close state.

On the other hand, when calculated system voltage effective value VINrms is smaller than voltage threshold Vth, controller 250 determines that system voltage VIN is decreased, and halts the external charging. Specifically, controller 250 halts the operations of PFC circuit 210 and inverter 215, and brings precharging relay 209 into the open state in preparation for subsequent resumption of charging.

Figure 3:
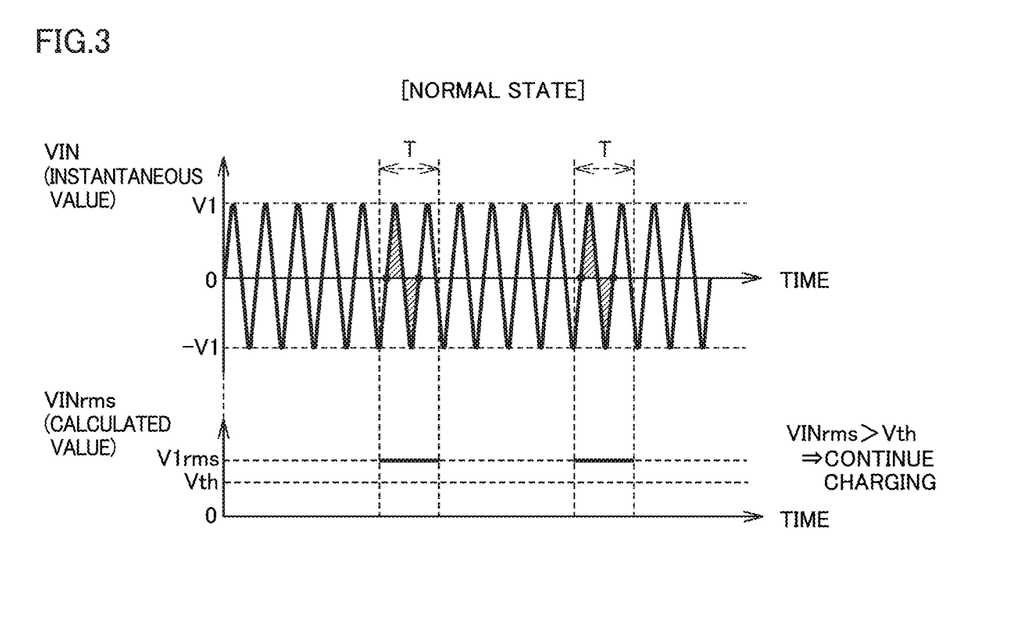
FIG. 3 schematically shows a waveform (upper part) of system voltage VIN during a normal state, and a system voltage effective value VINrms (lower part) calculated by a controller.

FIG. 3 schematically shows the waveform (upper part) of system voltage VIN during the normal state, and system voltage effective value VINrms (lower part) calculated by controller 250. It should be noted that the waveform shown in the upper part of FIG. 3 schematically represents a waveform in the normal state in which the peak value and frequency of system voltage VIN are respectively normal peak value V1 and the normal frequency. "Normal effective value V1rms" shown in the lower part of FIG. 3 is a value obtained by dividing normal peak value V1 by the square root of 2 as described above (for example, when normal peak value V1 is about 141 V, normal effective value V1rms is about 100 V).

In the example shown in FIG. 3, since the AC voltage waveform for the one period is included in the voltage waveform for predetermined period T, controller 250 calculates system voltage effective value VINrms and system frequency F based on the AC voltage waveform for the one period. More specifically, controller 250 calculates, as system voltage effective value VINrms, the effective value (value corresponding to the average of areas of diagonally shaded portions of FIG. 3) of the AC voltage for the one period. Moreover, controller 250 calculates, as system frequency F, a reciprocal of the period of the AC voltage (a period of time from a zero cross point at which system voltage VIN is changed in sign from a negative sign to a positive sign to a zero cross point at which system voltage VIN is changed next in sign from a negative sign to a positive sign).

In the normal state, system voltage effective value VINrms is equal to normal effective value V1rms as shown in the lower part of FIG. 3, with the result that system voltage effective value VINrms becomes larger than voltage threshold Vth. In this case, controller 250 determines that an abnormal decrease of system voltage VIN does not occur, and continues the external charging. Controller 250 repeats such a process periodically.

Figure 4:
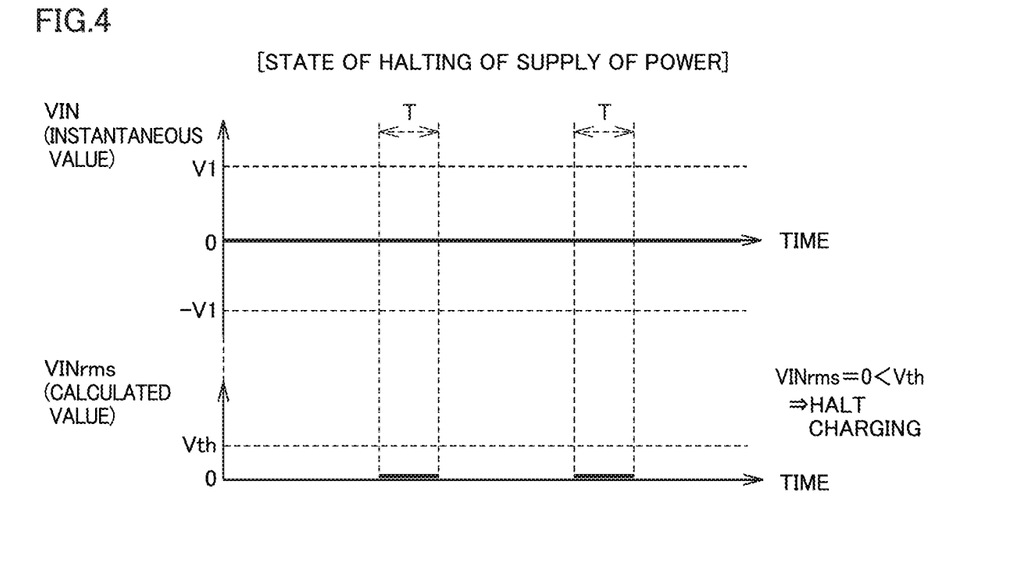
FIG. 4 schematically shows a waveform (upper part) of system voltage VIN during a state of halting of supply of power, and system voltage effective value VINrms (lower part) calculated by the controller.

FIG. 4 schematically shows a waveform (upper part) of system voltage VIN during a state of halting of supply of power, and a system voltage effective value VINrms (lower part) calculated by controller 250. As shown in FIG. 4, in the state of halting of supply of power, system voltage VIN is constant at 0 V, and no AC voltage waveform is included in predetermined period T. In this case, controller 250 calculates system voltage effective value VINrms as 0, does not calculate system frequency F, and determines that system frequency F is less than frequency threshold value Fth.

As a result, in the state of halting of supply of power, system voltage effective value VINrms (=0) is smaller than voltage threshold Vth as shown in the lower part of FIG. 4. In this case, controller 250 determines that an abnormal decrease of system voltage VIN occurs, halts the external charging, and brings precharging relay 209 into the open state in preparation for subsequent resumption of charging.

Figure 5:
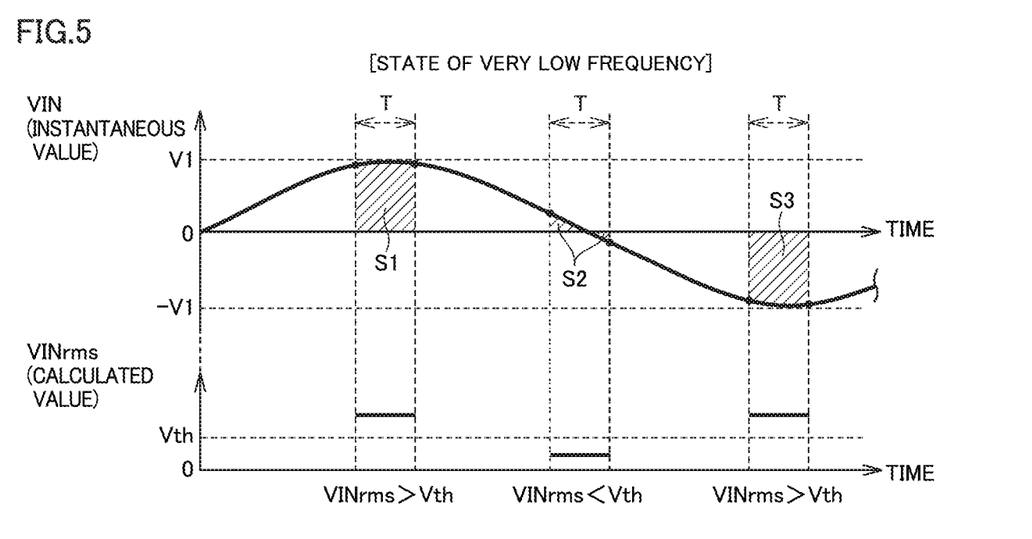
FIG. 5 schematically shows a waveform (upper part) of system voltage VIN in a state of very low frequency, and a calculated value of system voltage effective value VINrms (lower part) calculated by the controller.

FIG. 5 schematically shows a waveform (upper part) of system voltage VIN when system frequency F is very low (hereinafter, also referred to as "in the state of very low frequency") and a calculated value (lower part) of system voltage effective value VINrms calculated by controller 250. The "very low frequency" refers to such a very small frequency of low frequencies (frequencies of less than frequency threshold value Fth) that system voltage effective value VINrms calculated by controller 250 periodically becomes larger or smaller than voltage threshold Vth in accordance with a fluctuation in instantaneous value of system voltage VIN.

Even when system frequency F is a low frequency (frequency of less than frequency threshold value Fth), the external charging can be performed as long as the peak value of system voltage VIN is normal peak value V1 or a value close thereto. Hence, there is a need to continue the external charging. However, in the state of very low frequency, as shown in FIG. 5, even when the peak value of system voltage VIN is normal peak value V1, the calculated value of system voltage effective value VINrms does not become normal effective value V1rms and periodically becomes larger or smaller than voltage threshold Vth in accordance with a fluctuation in instantaneous value of system voltage VIN. Specifically, when system voltage VIN is around a positive peak value (=V1), the integrated value (value corresponding to an area of a diagonally shaded portion S1 of FIG. 5) of system voltage VIN for predetermined period T is large, with the result that system voltage effective value VINrms becomes larger than voltage threshold Vth. When system voltage VIN is around 0 V, the integrated value (value corresponding to areas of diagonally shaded portions S2 of FIG. 5) of system voltage VIN for predetermined period T is small, with the result that system voltage effective value VINrms becomes smaller than voltage threshold Vth. Then, when system voltage VIN is around a negative peak value (=−V1), the integrated value (value corresponding to an area of diagonally shaded portion S3 of FIG. 5) of system voltage VIN for predetermined period T becomes large again, with the result that system voltage effective value VINrms becomes larger than voltage threshold Vth again.

Therefore, when the external charging is simply halted and resumed in accordance with a result of comparison between system voltage effective value VINrms and voltage threshold Vth, the following phenomenon (hereinafter, also simply referred to as "relay hunting") occurs in the state of very low frequency: the operation of halting the external charging and opening precharging relay 209 and the operation of resuming the external charging and closing precharging relay 209 are repeated periodically in accordance with a fluctuation in instantaneous value of system voltage VIN. This can be a factor of deterioration of precharging relay 209.

Figure 6:
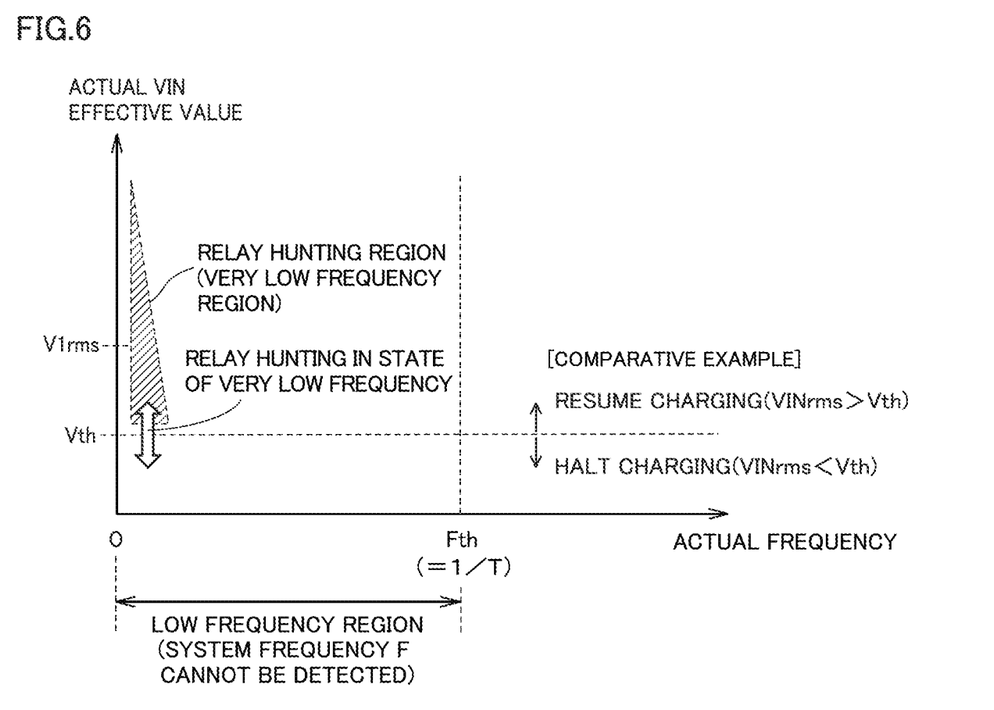
FIG. 6 schematically shows a corresponding relation among an actual frequency of system voltage VIN, an actual effective value of system voltage VIN, and a relay hunting region.

FIG. 6 schematically shows a corresponding relation among the actual frequency of system voltage VIN, the actual effective value of system voltage VIN (i.e., the effective value of system voltage VIN for the one period), and a very low frequency region (hereinafter, also referred to as "relay hunting region") in which relay hunting occurs. In FIG. 6, the horizontal axis represents the actual frequency of system voltage VIN, and the vertical axis represents the actual effective value of system voltage VIN. It should be noted that "frequency threshold value Fth" represented on the horizontal axis of FIG. 6 is a value (=1/T) obtained by converting predetermined period T into a frequency as described above. Therefore, when the actual frequency of system voltage VIN is included in a region of more than frequency threshold value Fth, system frequency F can be calculated by controller 250; however, when the actual frequency of system voltage VIN is included in a region (hereinafter, also referred to as "low frequency region") of less than frequency threshold value Fth, system frequency F cannot be calculated by controller 250.

When a point obtained by plotting a combination of the actual frequency and actual effective value of system voltage VIN is included in the relay hunting region shown in FIG. 6, system voltage effective value VINrms calculated by controller 250 becomes larger or smaller than voltage threshold Vth in accordance with the period of system voltage VIN. That is, the state in which the point obtained by plotting the combination of the actual frequency and actual effective value of system voltage VIN is included in the relay hunting region corresponds to the "state of very low frequency" as shown in FIG. 5 above. Therefore, when the charging is simply halted and resumed in accordance with a result of comparison between system voltage effective value VINrms and voltage threshold Vth, the above-described relay hunting occurs in the state of very low frequency in accordance with the period of system voltage VIN. This can be a factor of deterioration of precharging relay 209.

In view of this, in the present embodiment, the charging halting condition and charging resumption condition based on system voltage VIN are set as follows.

The charging halting condition is set to the following condition: "system voltage effective value VINrms is smaller than voltage threshold Vth". Accordingly, even when the actual frequency of system voltage VIN is decreased to be less than frequency threshold value Fth, the external charging can be continued until system voltage effective value VINrms becomes less than voltage threshold Vth. It should be noted that for example, in the case where the actual frequency of system voltage VIN is then further decreased to be a very low frequency, system voltage effective value VINrms becomes less than voltage threshold Vth when system voltage VIN is around 0 V, with the result that the charging halting condition is satisfied. Hence, controller 250 halts the external charging and brings precharging relay 209 into the open state in preparation for subsequent resumption of charging.

On the other hand, the charging resumption condition is not simply set to the condition that "system voltage effective value VINrms is larger than voltage threshold Vth", and is set to a condition that "system voltage effective value VINrms is larger than voltage threshold Vth and system frequency F is larger than frequency threshold value Fth".

Accordingly, for example, when the actual frequency of system voltage VIN is maintained at the very low frequency, even if system voltage VIN becomes around the peak value and system voltage effective value VINrms becomes larger than voltage threshold Vth temporarily, system frequency F cannot be calculated by controller 250 and therefore it is not determined that system frequency F is larger than frequency threshold value Fth. Accordingly, the charging resumption condition is not satisfied and precharging relay 209 is maintained in the open state. Accordingly, the relay hunting is prevented from occurring due to system voltage effective value VINrms being fluctuated in accordance with the period of system voltage VIN in the state of very low frequency.

Figure 7:
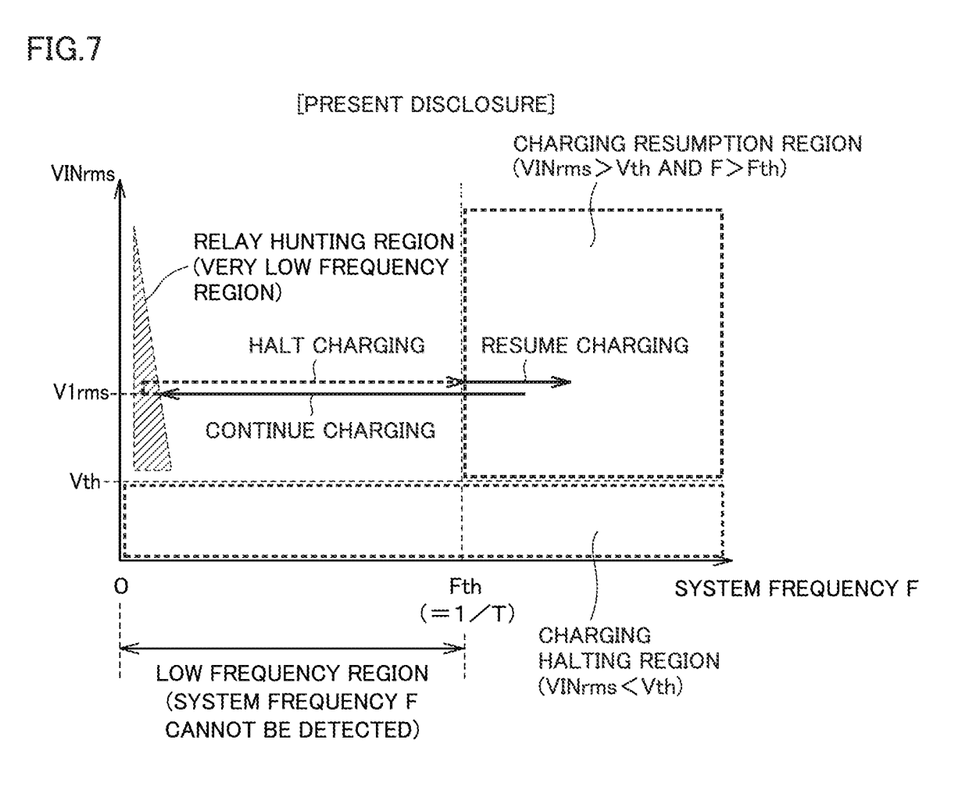
FIG. 7 schematically shows a corresponding relation among a system frequency F, system voltage effective value VINrms, the relay hunting region, a charging halting region in which a charging halting condition is satisfied, and a charging resumption region in which a charging resumption condition is satisfied.

FIG. 7 schematically shows a corresponding relation among system frequency F, system voltage effective value VINrms, the relay hunting region, a charging halting region in which the charging halting condition is satisfied, and a charging resumption region in which the charging resumption condition is satisfied. In FIG. 7, the horizontal axis represents system frequency F and the vertical axis represents system voltage effective value VINrms. As shown in FIG. 7, the charging halting region is a region in which system voltage effective value VINrms is smaller than voltage threshold Vth. Moreover, the charging resumption region is a region in which system voltage effective value VINrms is larger than voltage threshold Vth and system frequency F is larger than frequency threshold value Fth.

Here, the following case is assumed: when the peak value of system voltage VIN is maintained at normal peak value V1, the actual frequency of system voltage VIN is decreased from the normal frequency to the very low frequency, and is then returned to the normal frequency again. In this case, even when the actual frequency of system voltage VIN is decreased to be less than frequency threshold value Fth, system voltage effective value VINrms calculated by controller 250 is maintained to be larger than voltage threshold Vth unless the actual frequency of system voltage VIN is decreased to be the very low frequency, with the result that the external charging is continued.

Then, in the case where the actual frequency of system voltage VIN is further decreased to be included in the relay hunting region (very low frequency region), system voltage effective value VINrms becomes temporarily less than voltage threshold Vth when system voltage VIN is around 0 V, with the result that the charging halting condition is satisfied. Hence, the external charging is halted and precharging relay 209 is opened. However, while the actual frequency of system voltage VIN is included in the relay hunting region, system frequency F cannot be calculated by controller 250 and it is not determined that system frequency F is larger than frequency threshold value Fth, with the result that the charging resumption condition is not satisfied. Hence, even when system voltage VIN becomes around the peak value and system voltage effective value VINrms becomes larger than voltage threshold Vth temporarily, the external charging is not resumed and precharging relay 209 is maintained in the open state. Accordingly, relay hunting is prevented.

Even when the actual frequency of system voltage VIN is then increased to fall out of the relay hunting region (very low frequency region), system frequency F cannot be still calculated by controller 250 while the actual frequency of system voltage VIN is included in the low frequency region (region of less than frequency threshold value Fth), and it is not determined that system frequency F is larger than frequency threshold value Fth. Hence, the charging resumption condition is not satisfied.

When the actual frequency of system voltage VIN is then further increased to become larger than frequency threshold value Fth, system frequency F can be calculated by controller 250, it is determined that system frequency F is larger than frequency threshold value Fth, and system voltage effective value VINrms becomes normal effective value V1rms (>voltage threshold Vth), with the result that the charging resumption condition is satisfied. Accordingly, the external charging is resumed and precharging relay 209 is closed after precharging capacitor C1.

Figure 8:
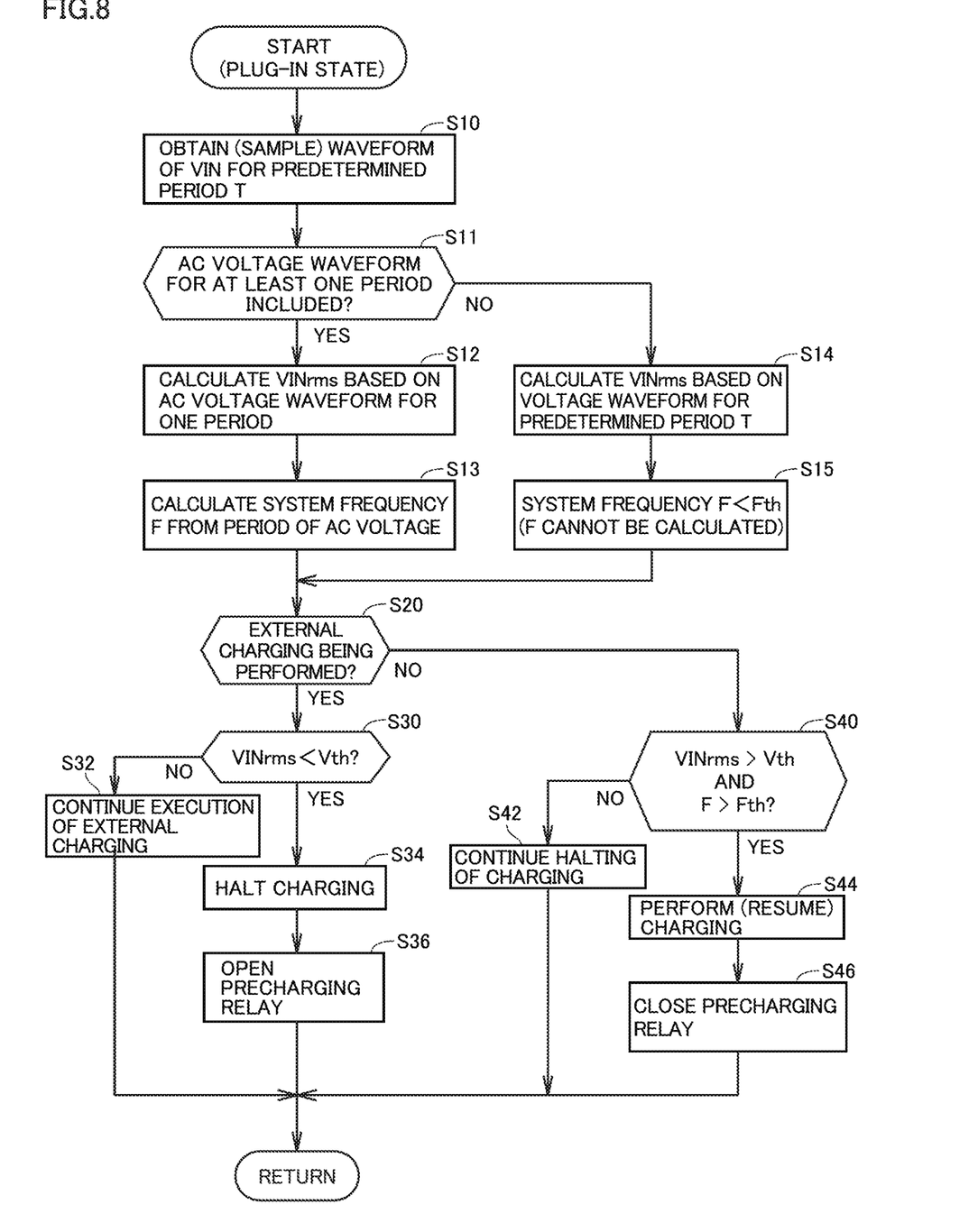
FIG. 8 is a flowchart showing an exemplary overview of a process procedure of a controller.

FIG. 8 is a flowchart showing an exemplary overview of a process procedure of controller 250. This flowchart is repeatedly executed whenever a predetermined condition is satisfied (for example, whenever a predetermined period elapses) in the plug-in state.

Controller 250 obtains (samples) the waveform of system voltage VIN for predetermined period T (step S10).

Next, controller 250 determines whether or not the obtained voltage waveform for predetermined period T in step S10 includes an AC voltage waveform for at least one period (step S11).

When the voltage waveform for predetermined period T includes the AC voltage waveform for the at least one period (YES in step S11), controller 250 calculates system voltage effective value VINrms from the AC voltage waveform for the one period (step S12). Specifically, controller 250 integrates the effective value (root mean square) of the AC voltage waveform for the one period, i.e., integrates the value of the square of the instantaneous value of system voltage VIN for the one period, and calculates, as system voltage effective value VINrms, the value of the square root of the value obtained by dividing the integrated value by the one period as described above. Further, controller 250 calculates system frequency F from the period of the AC voltage (step S13). Specifically, controller 250 measures, as the one period of the AC voltage, a period of time from a zero cross point at which system voltage VIN is changed in sign from a negative sign to a positive sign to a zero cross point at which system voltage VIN is changed next in sign from a negative sign to a positive sign. Controller 250 calculates a reciprocal of the measured period as system frequency F.

On the other hand, when the obtained voltage waveform for predetermined period T in step S10 does not include the AC voltage waveform for the at least one period (NO in step S11), controller 250 calculates system voltage effective value VINrms based on the voltage waveform for predetermined period T (step S14). Specifically, controller 250 integrates the effective value (root mean square) of the voltage waveform for predetermined period T, i.e., integrates the value of the square of the instantaneous value of system voltage VIN for predetermined period T, and calculates, as system voltage effective value VINrms, the value of the square root of the value obtained by dividing the integrated value by predetermined period T as described above. Further, controller 250 determines that system frequency F is less than frequency threshold value Fth (step S15).

After step S13 or step S15, controller 250 determines whether or not the external charging is being performed (step S20). For example, when PFC circuit 210 and inverter 215 are being operated with precharging relay 209 being closed, controller 250 determines that the external charging is being performed. When PFC circuit 210 and inverter 215 are nonoperational with precharging relay 209 being opened, controller 250 determines that the external charging is not being performed.

When the external charging is being performed (YES in step S20), controller 250 determines whether or not system voltage effective value VINrms calculated in step S12 or step S14 is smaller than voltage threshold Vth, i.e., determines whether or not the above-described charging halting condition is satisfied (step S30). When system voltage effective value VINrms is more than or equal to voltage threshold Vth, i.e., when the charging halting condition is not satisfied (NO in step S30), controller 250 continues the execution of the external charging (step S32). Specifically, controller 250 continues the operations of PFC circuit 210 and inverter 215 and maintains precharging relay 209 in the close state.

When system voltage effective value VINrms is smaller than voltage threshold Vth, i.e., when the above-described charging halting condition is satisfied (YES in step S30), controller 250 halts the operations of PFC circuit 210 and inverter 215 and halts the external charging (step S34), and brings precharging relay 209 into the open state in preparation for subsequent resumption of charging (step S36). Then, controller 250 brings the process to RETURN.

On the other hand, when the external charging is not being performed (NO in step S20), controller 250 determines whether or not system voltage effective value VINrms calculated in step S12 or step S14 is larger than voltage threshold Vth and system frequency F calculated in step S13 is larger than frequency threshold value Fth, i.e., determines whether or not the above-described charging resumption condition is satisfied (step S40).

When the charging resumption condition is not satisfied (NO in step S40), controller 250 continues the halting of the external charging (step S42). Specifically, controller 250 maintains PFC circuit 210 and inverter 215 to be non-operational and maintains precharging relay 209 in the open state.

When the charging resumption condition is satisfied (YES in step S40), controller 250 operates PFC circuit 210 and inverter 215 and performs (resumes) the external charging (step S44), and brings precharging relay 209 into the close state after precharging capacitor C1 (step S46).

As described above, in the present embodiment, the charging halting condition is set to the condition "system voltage effective value VINrms is smaller than voltage threshold Vth", and the charging resumption condition is set to the condition "system voltage effective value VINrms is larger than voltage threshold Vth and system frequency F is larger than frequency threshold value Fth". Accordingly, even when the actual frequency of system voltage VIN is low, the external charging can be continued while preventing hunting of precharging relay 209.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charger for performing external charging to charge a power storage device using AC power supplied from an external power supply, the charger comprising:
   an input line connectable to the external power supply;
   a conversion circuit that performs power conversion between the input line and the power storage device;
   a relay provided between the input line and the conversion circuit;
   a voltage sensor that detects AC voltage input to the input line; and
   a controller that periodically performs a process for calculating an effective value and a frequency of the AC voltage based on a waveform of the AC voltage for a predetermined period, wherein
   when a charging halting condition is satisfied during execution of the external charging, the controller brings the relay into an open state,
   when a charging resumption condition is satisfied after the external charging is halted, the controller brings the relay into a close state,
   the charging halting condition is set to a condition that the calculated effective value of the AC voltage is smaller than a voltage threshold, and
   the charging resumption condition is set to a condition that the calculated effective value of the AC voltage is larger than the voltage threshold and the calculated frequency of the AC voltage is larger than a frequency threshold value.

2. The charger according to claim 1, wherein
   when the waveform of the AC voltage for the predetermined period includes a waveform of the AC voltage for one period, the controller calculates an effective value and a frequency of the AC voltage for the one period,
   when the waveform of the AC voltage for the predetermined period does not include the waveform of the AC voltage for the one period, the controller calculates an effective value of the AC voltage for the predetermined period, and
   the frequency threshold value is set to a value obtained by converting the predetermined period into a frequency.

3. The charger according to claim 1, further comprising a resistor provided between the input line and the conversion circuit, wherein the relay is connected to the resistor in parallel.

4. A method for controlling a charger for performing external charging to charge a power storage device using AC power supplied from an external power supply,
   the charger including
      an input line connectable to the external power supply,
      a conversion circuit that performs power conversion between the input line and the power storage device,
      a relay provided between the input line and the conversion circuit, and
      a voltage sensor that detects AC voltage input to the input line,
   the method comprising:
   periodically performing a process for calculating an effective value and a frequency of the AC voltage based on a waveform of the AC voltage for a predetermined period;
   bringing the relay into an open state when a charging halting condition is satisfied during execution of the external charging; and
   bringing the relay into a close state when a charging resumption condition is satisfied after the external charging is halted, wherein
   the charging halting condition is set to a condition that the calculated effective value of the AC voltage is smaller than a voltage threshold, and
   the charging resumption condition is set to a condition that the calculated effective value of the AC voltage is larger than the voltage threshold and the calculated frequency of the AC voltage is larger than a frequency threshold value.

5. The method according to claim 4, wherein
when the waveform of the AC voltage for the predetermined period includes a waveform of the AC voltage for one period, the controller calculates an effective value and a frequency of the AC voltage for the one period,
when the waveform of the AC voltage for the predetermined period does not include the waveform of the AC voltage for the one period, the controller calculates an effective value of the AC voltage for the predetermined period, and
the frequency threshold value is set to a value obtained by converting the predetermined period into a frequency.

6. The method according to claim 4, further comprising a resistor provided between the input line and the conversion circuit, wherein the relay is connected to the resistor in parallel.

7. A vehicle for performing external charging to charge a power storage device using AC power supplied from an external power supply that is external to the vehicle, the vehicle comprising:
a charger that includes:
an input line connectable to the external power supply;
a conversion circuit that performs power conversion between the input line and the power storage device;
a relay provided between the input line and the conversion circuit;
a voltage sensor that detects AC voltage input to the input line; and
a controller that periodically performs a process for calculating an effective value and a frequency of the AC voltage based on a waveform of the AC voltage for a predetermined period, wherein
when a charging halting condition is satisfied during execution of the external charging, the controller brings the relay into an open state,
when a charging resumption condition is satisfied after the external charging is halted, the controller brings the relay into a close state,
the charging halting condition is set to a condition that the calculated effective value of the AC voltage is smaller than a voltage threshold,
the charging resumption condition is set to a condition that the calculated effective value of the AC voltage is larger than the voltage threshold and the calculated frequency of the AC voltage is larger than a frequency threshold value.

8. The vehicle according to claim 7, wherein
when the waveform of the AC voltage for the predetermined period includes a waveform of the AC voltage for one period, the controller calculates an effective value and a frequency of the AC voltage for the one period,
when the waveform of the AC voltage for the predetermined period does not include the waveform of the AC voltage for the one period, the controller calculates an effective value of the AC voltage for the predetermined period, and
the frequency threshold value is set to a value obtained by converting the predetermined period into a frequency.

9. The vehicle according to claim 7, further comprising a resistor provided between the input line and the conversion circuit, wherein the relay is connected to the resistor in parallel.

* * * * *